(12) United States Patent
Bergmiller et al.

(10) Patent No.: US 8,177,294 B2
(45) Date of Patent: May 15, 2012

(54) VEHICLE ROOF

(75) Inventors: Alexander Bergmiller, Koenigsbrunn (DE); Wolfgang Seifert, Wielenbach (DE); Gerhard Skorianz, Maisach (DE); Dirk Hofmann, Munich (DE); Norbert Elbs, Munich (DE)

(73) Assignee: Webasto AG, Stockdorf (DE)

( * ) Notice: Subject to any disclaimer, the term of this patent is extended or adjusted under 35 U.S.C. 154(b) by 168 days.

(21) Appl. No.: 12/524,692

(22) PCT Filed: Jan. 25, 2008

(86) PCT No.: PCT/DE2008/000132
§ 371 (c)(1),
(2), (4) Date: Jul. 29, 2009

(87) PCT Pub. No.: WO2008/089745
PCT Pub. Date: Jul. 31, 2008

(65) Prior Publication Data
US 2010/0013270 A1    Jan. 21, 2010

(30) Foreign Application Priority Data

Jan. 25, 2007   (DE) .................. 10 2007 003 866
Apr. 2, 2007    (DE) .................. 10 2007 015 709

(51) Int. Cl.
*B60J 10/12*    (2006.01)
(52) U.S. Cl. ............................................. 296/216.06
(58) Field of Classification Search ............ 296/216.06, 296/102, 121, 136.01, 136.07, 210, 213, 296/214, 216.01, 218, 224, 222
See application file for complete search history.

(56) References Cited

U.S. PATENT DOCUMENTS

| 2,272,535 | A |   | 2/1942  | Votypka |
| 3,994,525 | A | * | 11/1976 | Breitschwerdt et al. . 296/220.01 |
| 4,081,194 | A | * | 3/1978  | Jardin ............................ 296/217 |
| 4,126,352 | A | * | 11/1978 | Vogel ............................. 296/218 |
| 4,229,037 | A | * | 10/1980 | Vermeulen ............... 296/216.04 |
| 4,312,533 | A | * | 1/1982  | Jardin et al. .................. 296/214 |
| 4,312,534 | A | * | 1/1982  | Jardin et al. ............. 296/216.09 |
| 4,418,956 | A | * | 12/1983 | Yamamoto et al. ...... 296/216.09 |
| 4,428,155 | A | * | 1/1984  | Kwan et al. ..................... 49/465 |
| 4,475,765 | A | * | 10/1984 | Vogt et al. ..................... 296/210 |
| 4,509,791 | A | * | 4/1985  | Bienert et al. ........... 296/216.09 |

(Continued)

FOREIGN PATENT DOCUMENTS

DE            31 00 757 A1    12/1981

(Continued)

*Primary Examiner* — Kiran B Patel
(74) *Attorney, Agent, or Firm* — Roberts Mlotkowki Safran & Cole, P.C.; David S. Safran

(57) ABSTRACT

A vehicle roof with a roof opening disposed within a fixed roof outer skin of a vehicle and a cover (10) to optionally close and at least partially open the roof opening. To at least partially open the roof opening, the cover can be both tilted out from a closed position at its rear edge and displaced in the driving direction to the rear. The cover has at least one locking lug (12a, 12b) in the region of its leading edge (14) that engages, from below in a closed position of the cover, into a support element that is stiff in a direction perpendicular to the roof outer skin. Additionally, the cover is formed at its rear edge such that engagement from below under the lateral and rear areas of the roof opening does not occur in the closed position.

11 Claims, 6 Drawing Sheets

U.S. PATENT DOCUMENTS

| | | | |
|---|---|---|---|
| 4,747,630 A * | 5/1988 | Isomine et al. | 292/263 |
| 4,811,985 A * | 3/1989 | Kruger et al. | 296/214 |
| 4,913,486 A | 4/1990 | Staley et al. | |
| 4,919,475 A | 4/1990 | Schlapp et al. | |
| 5,104,178 A * | 4/1992 | Bienert | 296/216.08 |
| 5,248,278 A * | 9/1993 | Fuerst et al. | 454/129 |
| 5,727,839 A * | 3/1998 | Ruhringer et al. | 296/213 |
| 5,775,769 A | 7/1998 | Reihl et al. | |
| 5,950,366 A * | 9/1999 | Uhlmeyer | 49/484.1 |
| 6,073,994 A * | 6/2000 | Jardin et al. | 296/213 |
| 6,076,886 A * | 6/2000 | Petri et al. | 296/216.09 |
| 6,079,771 A * | 6/2000 | Brandner et al. | 296/216.09 |
| 6,155,635 A | 12/2000 | Wecker | 296/211 |
| 6,283,540 B1 * | 9/2001 | Siebelink et al. | 296/191 |
| 6,283,542 B1 * | 9/2001 | P.ang.tz | 296/211 |
| 6,309,013 B1 * | 10/2001 | Staltmayer et al. | 296/214 |
| 6,332,645 B1 * | 12/2001 | Schwarz | 296/216.09 |
| 6,338,526 B1 * | 1/2002 | Jardin et al. | 296/216.06 |
| 6,340,204 B1 * | 1/2002 | Seifert | 296/216.07 |
| 6,367,872 B1 * | 4/2002 | Bohm et al. | 296/214 |
| 6,378,935 B2 * | 4/2002 | Dryselius et al. | 296/213 |
| 6,491,341 B2 * | 12/2002 | Grimm et al. | 296/216.09 |
| 6,517,150 B2 * | 2/2003 | De Gaillard et al. | 296/216.06 |
| 6,540,289 B2 * | 4/2003 | Bergmiller et al. | 296/216.09 |
| 6,550,851 B2 * | 4/2003 | Seifert | 296/210 |
| 6,550,852 B2 * | 4/2003 | Patz et al. | 296/211 |
| 6,672,655 B2 * | 1/2004 | Zinsmeister et al. | 296/210 |
| 6,837,538 B2 * | 1/2005 | Itoh et al. | 296/216.06 |
| 6,851,744 B2 * | 2/2005 | Niebuhr et al. | 296/213 |
| 6,908,136 B2 * | 6/2005 | Bohm et al. | 296/39.1 |
| 6,969,111 B2 * | 11/2005 | Ota | 296/213 |
| 6,974,183 B2 * | 12/2005 | Bergmiller et al. | 296/220.01 |
| 6,988,766 B2 * | 1/2006 | Yamada | 296/216.06 |
| 7,032,963 B2 * | 4/2006 | Deppe et al. | 296/217 |
| 7,048,328 B2 * | 5/2006 | Tamura et al. | 296/216.09 |
| 7,311,871 B2 * | 12/2007 | Bergmiller et al. | 264/328.12 |
| 7,320,498 B2 * | 1/2008 | Boehm et al. | 296/216.06 |
| 7,360,826 B2 * | 4/2008 | Nakagawa et al. | 296/216.09 |
| 7,404,598 B2 * | 7/2008 | Huebner et al. | 296/216.09 |
| 7,651,159 B2 * | 1/2010 | Radmanic et al. | 296/213 |
| 7,938,483 B2 * | 5/2011 | Reitzloff et al. | 296/219 |
| 2002/0021029 A1 * | 2/2002 | Bohm et al. | 296/211 |
| 2005/0029839 A1 * | 2/2005 | Stemmer | 296/215 |
| 2007/0228779 A1 * | 10/2007 | Stallfort | 296/224 |

FOREIGN PATENT DOCUMENTS

| | | |
|---|---|---|
| DE | 197 13 347 C1 | 5/1999 |
| DE | 20 2007 012 126 U1 | 1/2008 |
| EP | 1 106 610 A2 | 4/1984 |
| JP | 62-265020 A | 11/1987 |

* cited by examiner

VEHICLE ROOF

BACKGROUND OF THE INVENTION

1. Field of the Invention

The present invention relates to a vehicle roof with a roof opening disposed within a fixed roof outer skin of a vehicle and a cover for optionally closing and at least partly opening the roof opening, in which the cover can be both tilted out at its rear edge and displaced in the driving direction to the rear to at least partially open the roof opening from a closed position.

2. Description of Related Art

Vehicle roofs according to the genre are known from prior art. For example, German Patent Application DE 195 12 342 A1 and corresponding U.S. Pat. No. 5,775,769 describe a vehicle roof with a fixed roof outer skin in which a roof opening is disposed that can be closed with a cover. At its rear edge, the cover can be tilted out in an upward direction or the cover can be displaced alternatively in a rearward direction to clear the roof opening. In the closed position of the roof opening, the cover fits below the fixed roof skin at its leading edge and its rear edge by which means it is prevented by form locking engagement on two sides from unintentionally passing through the roof opening in an upward direction.

SUMMARY OF THE INVENTION

It is a primary object of the present invention to provide a vehicle roof with an opening, which can be closed by a cover in which, on one hand, the cover is protected against an unintentional passing through the roof opening to the outside, but which, on the other hand, enables the movement of the cover that is necessary to open the roof opening to be simplified as compared to the approaches of the prior art.

This object is achieved by a vehicle roof of the type disclosed in U.S. Pat. No. 5,775,769 which has a roof opening disposed within a fixed roof outer skin of a vehicle and a cover for selectively closing and at least partly opening the roof opening, in which the cover can be both tilted out at its rear edge and displaced to the rear relative to a forward driving direction to at least partially open the roof opening from a closed position, where the cover comprises at least a locking lug in the region of its leading edge, that engages from below, in a closed position of the cover, into a support element that is stiff in a direction perpendicular to the roof outer skin and which is hereby incorporated by reference to the extent necessary to complete an understanding of this invention, by the cover being formed at its rear edge such that an engagement from below under the neighboring regions of the roof opening does not occur in the closed position.

The advantage of a vehicle roof according to the invention is the securing of the cover in the closed position at its leading edge against lifting when the car undergoes a rattling movement or the blowing air causes a suction effect, since the cover comprises at least one locking lug in the region of its leading edge, the lug engages a rigid supporting element from below in the closed position of the cover in a direction perpendicular to the outer roof skin. As such an engagement from below does not occur in the closed position in the region of the rear edge of the cover, the cover can be tilted out in an upward direction at the rear edge without a complex movement of the cover being needed to uncover the rear edge. Furthermore, by locking the cover at its leading edge in the closed position by means of the locking edge, the application of forces on the cover mechanics that are too large for the movement or fixation of the cover in the closed position of the cover is prevented, because a large part of the forces acting on the cover is received by the locking lug of the roof skin.

In a preferred embodiment of the invention, the cover is supported to be lowerable or liftable for movement in the longitudinal direction of the vehicle, to guide the cover above or below the fixed roof outer skin of the vehicle.

In another preferred embodiment of the invention, the supporting element is formed at a leading edge of the roof opening. In this context, the term leading edge of the roof opening is meant to denote that edge of the roof opening that due to its stability is suited to receive the typical forces acting on the roof opening because of the wind load or rattling movement. The edge can be an edge in the outer skin of the roof cutout or an attachment part mounted at such an edge, such as a seal, provided it is appropriately reinforced. Such a seal can be formed as a hollow chamber seal, for example, causing an especially good sealing efficiency. Furthermore, in an especially preferred embodiment of the invention, such a seal can be divided into a softer and a harder region, the harder region encouraging a support of the locking lug at the leading edge of the roof opening via a better traction, while the softer region improves the sealing behavior of the seal.

The harder region of the seal can also form the actual leading edge of the roof opening at which the locking lug is solely supported to be locked. Preferably, the harder region can be achieved by a reinforcement insert within the softer region. In an especially preferred embodiment of the invention, the harder region is disposed within a hollow chamber of the seal and can by formed, for example, as a continuous cord or as single cord section. Such a seal can also be attached as a locking lug in the region of the leading edge of the cover, in which the appropriate harder region exerts a locking nose function. Further, a seal can alternatively be attached at edge areas of the cover in addition to a locking lug. In these two embodiments of the invention with seals at the cover, a counter-seal on the edge of the roof opening can be omitted, but a dampening element can be mounted on the edge of the roof opening to dampen the contact movement of a locking lug at the roof.

In other preferred embodiments of the invention, the roof skin comprises an essentially right-angled first downward bend in a region of the leading edge of the roof opening, followed by an essentially vertical section of the roof skin, in which the seal can be fastened to this vertical section on the side assigned to the roof opening. This offers a reinforcement of the leading edge of the roof opening in addition to the mounting area for the seal. To further strengthen the edge of the roof opening, the essentially vertical section of the roof skin can be folded additionally. Such a fold means that the free end of the roof skin is folded over by approx. 180°. A seal that is attached in this region can preferably comprise an projection with a groove in which the folded region engages. In this way, the seal can be fit to the fold region of the roof opening edge, enabling an alternative or additional fixation of the sealing at the roof skin.

In another preferred embodiment of the invention, the roof skin is provided with a crank to the inside in a region of the leading edge of the roof opening. This means that the roof skin is guided in a preferably essentially right-angled first bend downwards (in the direction to the interior of the vehicle) and then again to the horizontal by means of a second bend, where it limits the roof opening. Again, the seal can comprise a groove which is provided correspondingly horizontal in there, and the free end of the roof skin engages into the groove.

In embodiments with a sealing at the leading edge of the roof opening, the locking lug preferably engages the sealing from below at least partially in the closed position. In the closed position, the locking lug can fit in a force locking engagement at the sealing to prevent a displacement of the cover to the outside. In an alternative, the sealing and the locking lug can be arranged with a distance to each other in the closed position of the cover so that a force locking engagement only takes place when a certain displacement of the cover to the outside occurs. In this way, on the one hand, a displacement of the cover to the outside will be prevented as a certain amount of deflection occurs, and on the other hand, a desired horizontal displacement of the cover to uncover the roof opening is facilitated, because the locking lug and the sealing are separated without an outer application of force, whereby friction and wear of the sealing and the locking lug are reduced.

In another preferred embodiment of the invention, the supporting element is formed as a hooked member which hooks into the locking lug of the cover and which can be flexibly formed in parallel to the sliding direction of the cover. The hooked member can be formed as a bracket attached to a frame part, or it can be alternatively formed by the roof frame itself.

In an especially preferred embodiment of the invention the cover comprises a transparent pane, for example, made of glass, and said pane can further be provided with a peripheral foam at which the locking lug is molded. To reinforce the cover construction, the peripheral foam can be provided with a reinforcement insert, which is preferably embedded in the peripheral foam when the peripheral foam is foamed onto the cover. For improving the stability of the locking lug, in an especially preferred embodiment of the invention, the reinforcement insert can extend at least in part into the locking lug. In an embodiment of a cover made of a transparent pane without peripheral foam, a reinforcement element is preferably attached directly to the pane, for example, adhered, and the reinforcement element itself also forms the locking lug.

In a preferred embodiment of the invention, a cover edge area is formed angled in the direction of the vehicle interior, and in this way, it also forms the locking lug. Instead of a locking lug with an angled shape, the locking lug also can form a projection of the cover edge area that slopes in the direction of the vehicle interior and toward the leading edge of the roof opening in each of the discussed embodiments of the invention.

These and further objects, features and advantages of the present invention will become apparent from the following detailed description when taken in connection with the accompanying drawings which, for purposes of illustration only, show several embodiments in accordance with the present invention.

DETAILED DESCRIPTION OF THE INVENTION

Figure 1A:
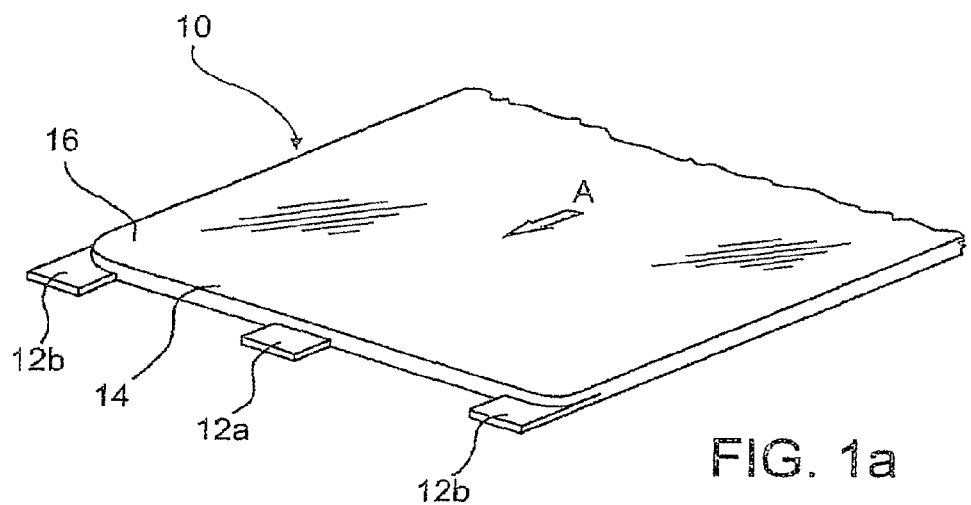
FIG. 1a is a perspective view from above on a cover of a vehicle roof according to the invention with three locking lugs at a leading edge of the cover.
Figure 1B:
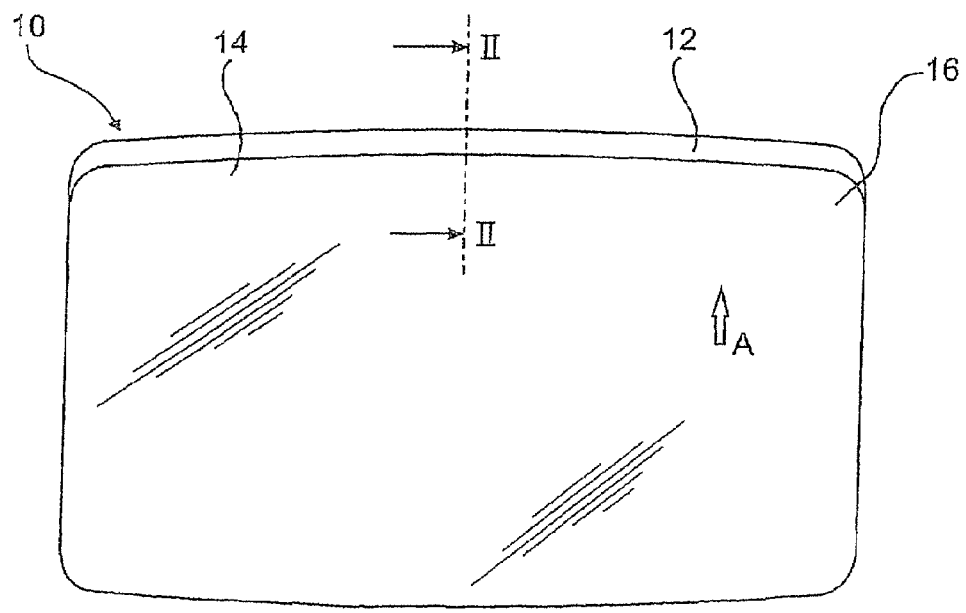
FIG. 1b is a view form above on an alternative embodiment of a cover according to the invention for a vehicle roof with a continuous locking lug at a leading edge of the cover.
Figure 6:
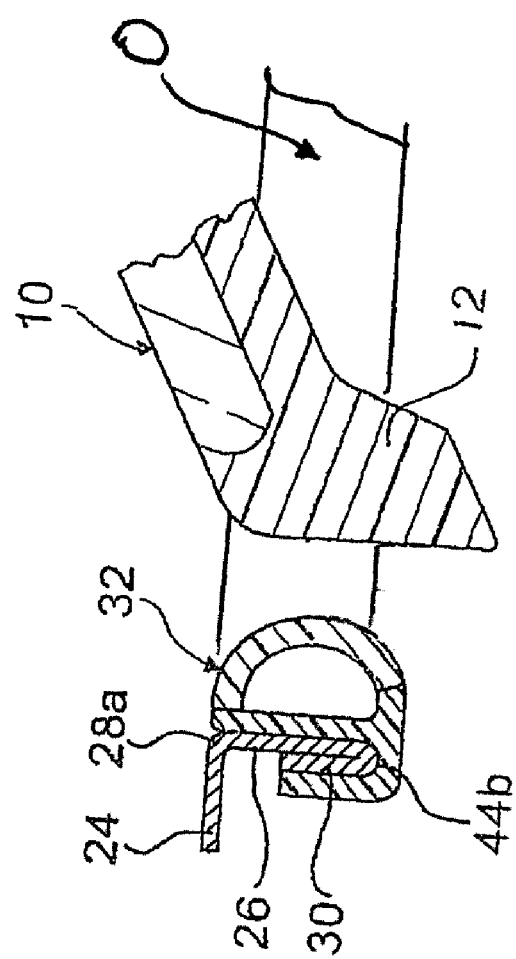
FIG. 6 shows the embodiment of FIG. 4c with the cover tilted up out of the closed position of FIG. 4c.

FIG. 1 shows a cover 10 of a vehicle roof according to the invention that can be displaced in a roof opening O along a direction A to cover the roof opening. In the region of a cover leading edge 14 of the cover 10, the cover comprises three locking lugs 12a, 12b, by means of which the cover is secured in a closed position against lifting off by the engagement from below under a leading edge of the roof opening. The locking lugs can be disposed directly at the leading edge 14 of the cover as is shown here for the locking lug 12a. However, the locking lugs can also reach to a corner area 16 of the cover 10 as is shown here for the locking lug 12b to achieve a locking of the cover in the closed position that is as good as possible. In this regard it is important that the cover is free of locking lugs in its lateral zones as well as on the rear edge so that it can be tilted out upwards around an axis running approximately along the leading edge 14 of the cover as shown in FIG. 6. The embodiment of the cover 10 with three locking lugs 12a, 12b is to be understood as merely exemplarily. Of course, more than three locking lugs can also be used. Alternatively, as is shown in FIG. 1b, a cover 10 can also comprise only one continuous locking lug 12 extending along a leading edge 14 of the cover.

Figure 2A:
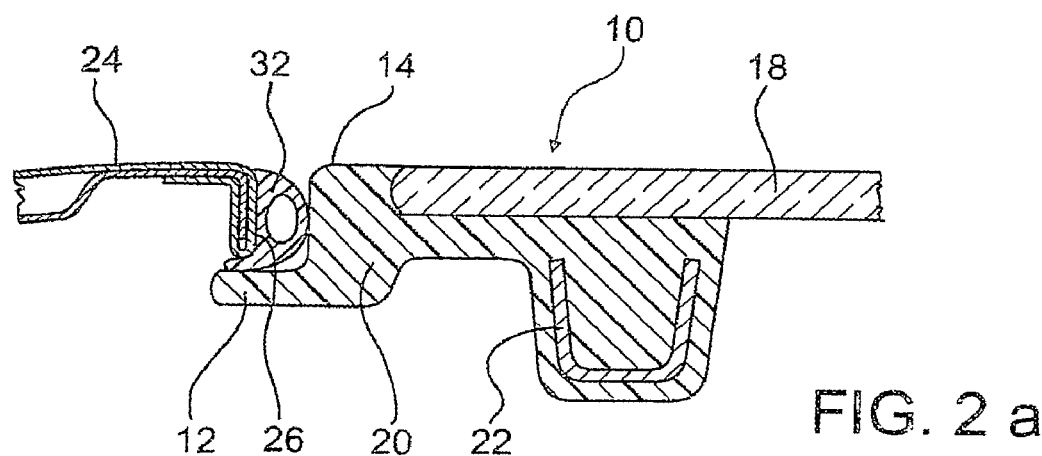
FIGS. 2a to 2d are cross-sectional views of alternative embodiments of covers according to the invention, wherein the cross section runs along the line II-II of FIG. 1b.

FIG. 2a shows a cross-sectional view along the line II-II of FIG. 1b of a leading edge 14 of the cover or of an adjacent section of a roof skin 24. The cover 14 comprises a transparent glass pane 18 having a peripheral foam 20 which is reinforced by a reinforcement insert 22. At the roof skin 24, a seal 32 is provided in a vertical section 26 of the roof skin that is bent downwardly here (toward the vehicle interior), and the seal 32 is formed as a hollow chamber seal. A locking lug 12, which is molded to the peripheral foam 20, is achieved as an angled continuation of the peripheral foam such that it engages from below into the seal 32 and into the vertical section 26 of the roof skin 24 in the illustrated closed position of the cover 10 and that it supports in force locking engagement at the sealing or the roof skin. In this way, a displacement of the cover 10 to the outside due to a rattling movement or a suction effect of the flowing air stream is avoided. Accordingly, cover mechanics (not shown) are correspondingly relieved of such forces in the region of the cover leading edge and the stability requirements for the cover mechanics are correspondingly lower.

Figure 2B:
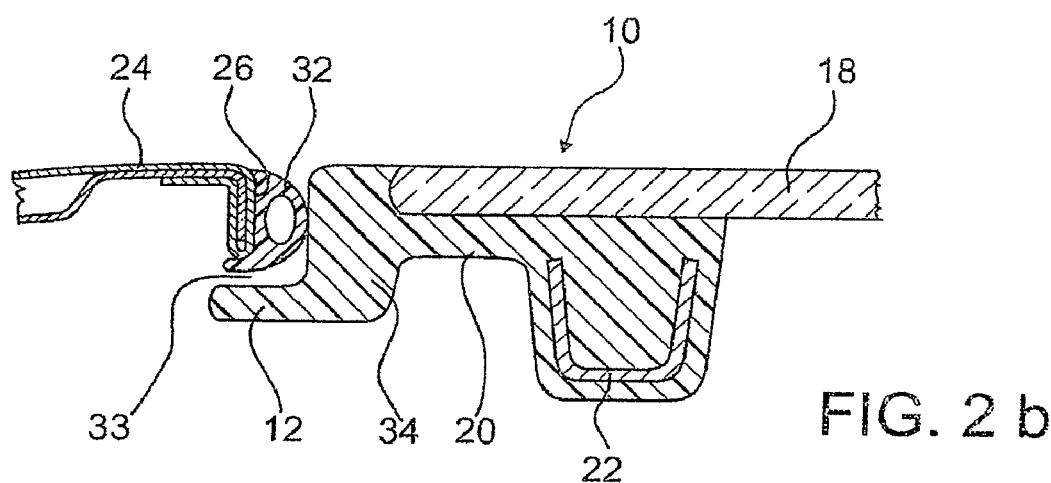

In FIG. 2b a vehicle roof is shown that is an alternative embodiment to FIG. 2a. The essential difference relative to the embodiment of FIG. 2a is the fact that the locking lug 12 comprises a longer angle 34 in the direction of the vehicle interior thereby creating a distance 33 of the locking lug 12 relative to the seal 32 and to the vertical section 26 of the roof skin 24, respectively, in the closed position of the cover 10. This distance 33 ensures, on the one hand, that the movement of the cover to uncover the roof opening is facilitated, since no friction between the locking lug 12 and the seal 32 is created at a displacement of the cover 10 to the right side of the figure. On the other hand, the distance 33 is reduced by an outward force on the cover in an upward direction of the figure to such a length that, from a certain deflection, the locking lug 12 comes into contact with the seal 32 or the roof skin 24 and a further displacement of the cover 10 toward the outside is stopped at this point.

Figure 2C:
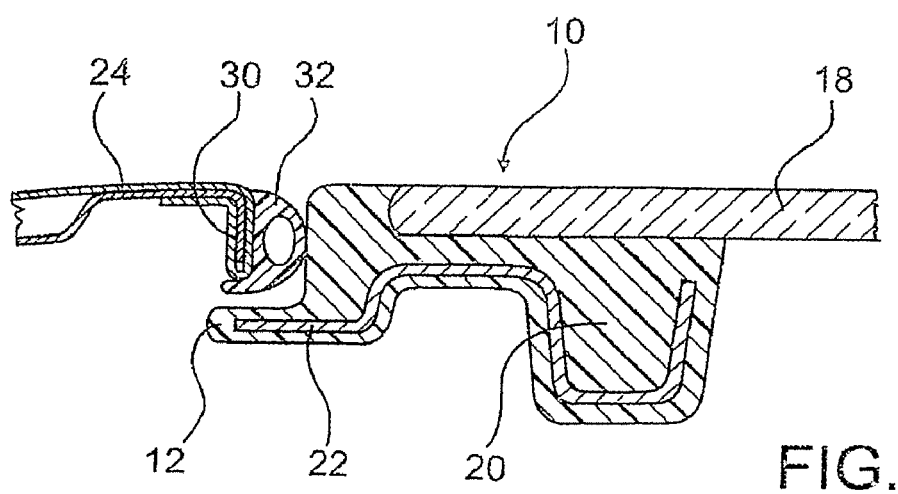

In an alternative embodiment of the invention, according to FIG. 2c, a cover 10 also comprises a peripheral foam 20 on a transparent glass pane 18, in which the peripheral foam is also reinforced by a reinforcement insert 22, for example, made of metal. However, as opposed to the embodiment of FIG. 2b, the reinforcement insert 22 extends into the region of the locking lug 12. In this way, it is ensured that the locking lug 12 is also reinforced by the reinforcement insert 22. When forces are applied to the cover toward the outside (in the direction of the figure upwards), the locking lug can therefore be supported more stiffly against a seal 32 and/or a fold 30 of the roof skin 24.

Figure 2D:
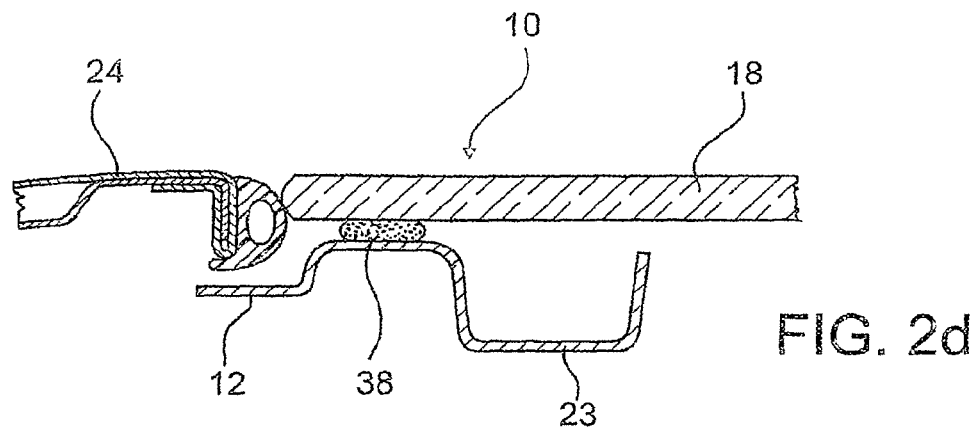

In FIG. 2d, a cover 10 of a vehicle roof according to the invention is shown which also comprises a glass pane 18 (as in the case of the embodiments of the FIGS. 2a to 2c), but that has no peripheral foam. In this case, a reinforcement member 23 is attached directly to the glass pane 18 by means of an adhesive bonded joint 38 to reinforce the glass pane 18. In this embodiment of the invention, a locking lug 12 is directly and solely formed by the reinforcement member 23.

Figure 3A:
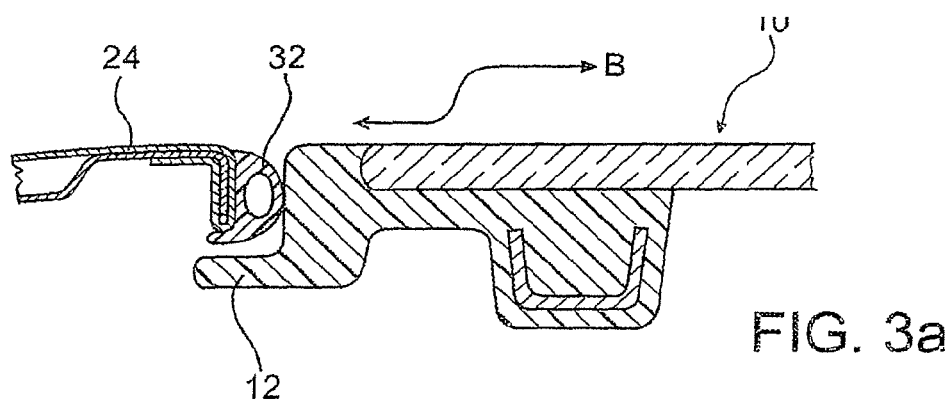
FIGS. 3a and 3b show alternative sliding paths to open or lock a vehicle roof according to the invention.
Figure 3B:
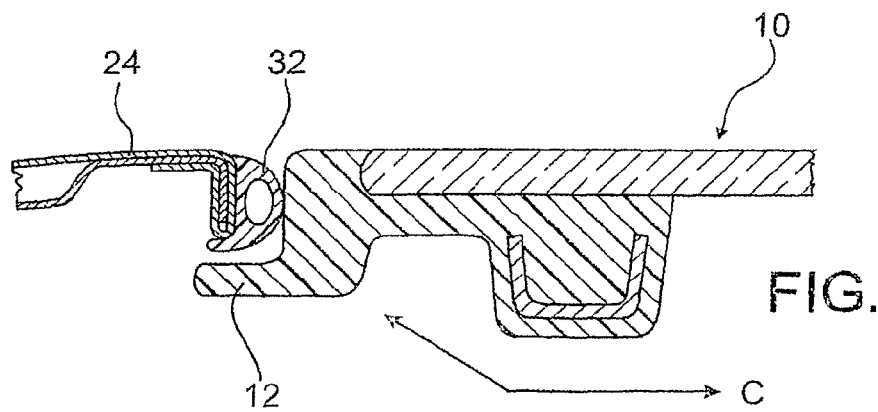

FIGS. 3a & 3b show alternative displacement paths B and C for movement of cover 10 to uncover a roof opening in a roof skin 24. When the cover 10 is displaced according to line B in FIG. 3a, the cover is first tilted out so that its rear edge is disposed above the fixed roof skin and then it is moved to the rear, until the locking lug 12 no longer engages the roof skin 24 or a seal 32 disposed at it from below. Then, the cover 10 is lifted from the roof opening in an upward direction, to displace it further rearward relative to a forward driving direction (in the figure to the right). Such a movement is used, for example, with a raisable or externally guided sunroof.

Different therefrom, the cover of the FIG. 3b is first displaced downward toward the vehicle interior (in the figure toward the bottom) and then is moved in a rearward direction (in the picture to the right), i.e., rearward relative to a forward driving direction, when the vehicle roof is to be opened. Such a lowering of the cover to uncover the opening in the roof skin 24 for example can be used together with a tilt/slide sunroof.

Different embodiments of seals 32 for use at a leading edge of an opening in a roof skin 24, where the cover is supported with its locking lug or lugs, are shown in the FIGS. 4a to 4e.

Figure 4A:
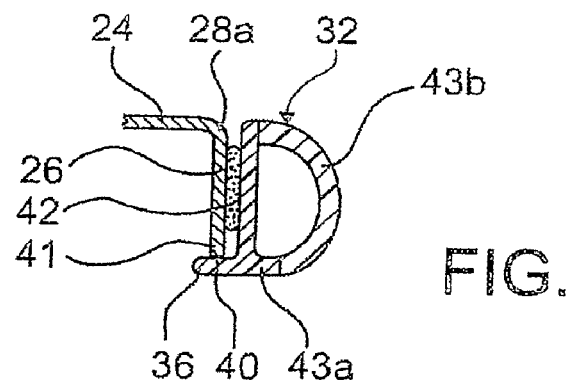
FIGS. 4a to 4e show different alternative embodiments of seals and leading edges of a roof opening of a vehicle roof according to the invention.

In the embodiment of FIG. 4a, the roof skin 24 is bent downwards toward the vehicle interior by a first bend 28 and therefore forms a vertical section 26b, at which a seal 32 is fastened by means of an adhesive joint 42. The seal 32 comprises a harder region 43a and a softer region 43b. For this purpose, materials with different hardnesses can, for example, be sprayed, foamed or extruded to form a seal. The harder region 43a serves to ensure a better force-locking engagement of a locking lug (not shown here) from below against the seal. The soft region 43b improves the sealing efficiency of the seal 32 against a cover (not shown here), that presses in a closed position from the right side against the seal 32. Furthermore, the seal 32 comprises a projection 36 with which the seal rests on an abutting face 40 of the vertical section 26 of the roof skin 24, and is supported against it. This projection 36 is formed by the harder region 43a of the seal 32 and supportingly engages against the abutting face 40 to further improve the vertical traction behavior of the seal 32 with a locking lug that fits from below and engages into the sealing from below.

Figure 4B:
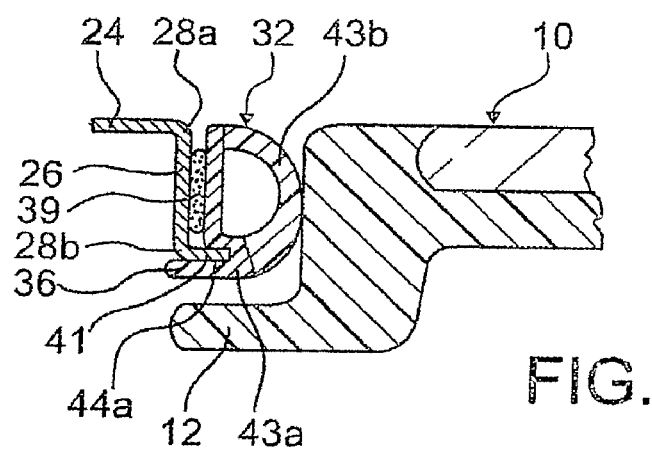

FIG. 4b shows an alternative embodiment of the invention in which, like in FIG. 4a, a roof skin also comprises a first vertical section 26, formed by the roof skin 24 being bent downwards with a first bend 28 from its horizontal arrangement at approx. 90 degrees relative to the vehicle interior. However, in contrast to the embodiment of FIG. 4a, here, the roof skin 24 comprises a second bend 28b following the vertical region 26, which brings the roof skin 24 again to a horizontal orientation. Therefore, a kind of angling of the roof skin 24 results in the direction of the vehicle interior (in the figure downwardly). Similar to FIG. 4a, a seal 32 is also disposed at the vertical section 26 of the roof skin 24 and fastened by means of an adhesive bond 39. But here, the seal 32 comprises an projection 36 with an essentially horizontal groove 44a, in which an essentially horizontal free end 41 of the roof skin 24 engages. Therefore, another fastening point of the sealing at the roof skin is provided in addition to the adhesive bond 39 by the form-fitting connection between the free end 41 of the roof skin 24 and the groove 44a of the seal 32. The angled embodiment of the edge of the roof skin 24 provides a resulting stiffening, and thus, improves the force locking engagement of the seal 32 in an upward direction in relation to a locking lug 12 of a cover 10 with respect to forces acting in an outward direction (upward in the figure). This supporting behavior as well as the sealing behavior, here, is also additionally improved by the division of the seal 32 in a harder area 43a and a softer area 43b.

Figure 4C:
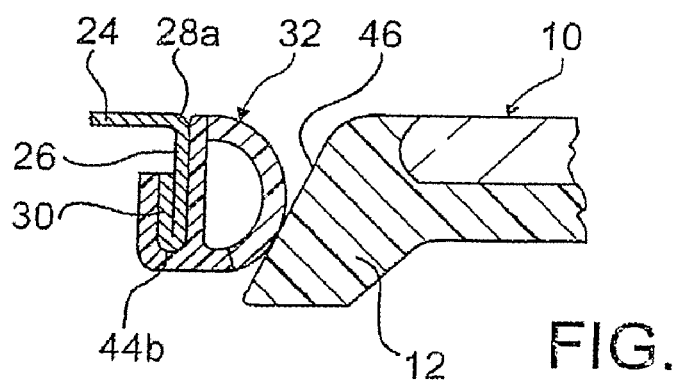

Another alternative embodiment of the invention is shown in FIG. 4c, in a cross-sectional view that is similar to those of FIGS. 4a and 4b. The difference relative to FIGS. 4a and 4b is, on the one hand, the embodiment of the edge of the roof skin 24, that forms a fold 30 after a first bend 28a, by which the roof skin is essentially directed perpendicularly to the vehicle interior (in the figure downwards), where the end of the roof skin 24 then being folded back in an upward direction. In turn, a seal 32 is fitted onto this fold 30 by means of a groove 44b that is formed vertically in it. The fastening of the seal 32 can either be done by merely fitting the fold 30 into the groove 44b, or additionally (not shown here) by an adhesive bond in a vertical region 26 of the roof skin 24. The cover 10 shown here comprises, like the cover of FIG. 4b, a locking lug 12. However, instead of the angle-type embodiment of FIG. 4b, here, the lug comprises a ramp shaped bevel 46 by means of which it supports itself in a closed position of the cover against the seal 32 and engages it from below.

Figure 4D:
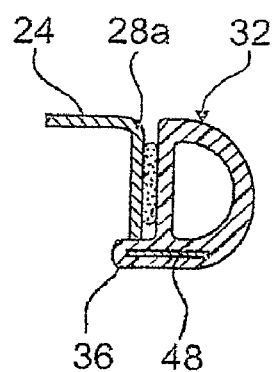

FIG. 4d shows an embodiment of the invention, in which as an alternative to the embodiment of FIG. 4a, a seal 32 comprises a reinforcement insert 48 as a harder region which, for example, can be molded into the seal 32. Here, the harder region in form of the reinforcement insert 41 serves also to improve the supporting behavior of the seal 32 in a direction vertically out of the roof opening (in the figure, in an upward direction).

Figure 4E:
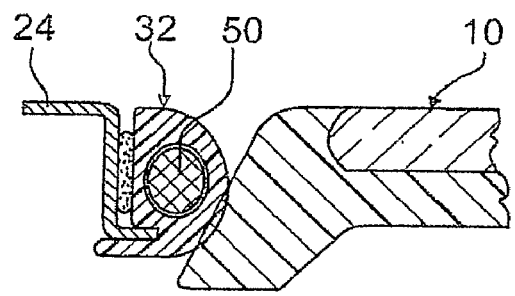

As an alternative to the reinforcement insert 48 which can be formed, for example, as a metal cord 50, that, in the case of using a hollow chamber seal, can be inserted into the hollow chamber of the seal 32 as is shown in FIG. 4e. Here, the cord 50 can extend along the full length of the seal 32 or it can be inserted only into certain sections of the seal 32 (particularly in regions to be engaged by locking lugs). The cord 50 serves here as a stiffening member of the seal 32 too.

In all embodiments of the figures, the locking lugs 12a, 12b and/or the seal 32 can be coated in a friction reducing manner. Such a coating can be, for example, made of a flocking or a sliding lacquer, and it also serves to minimize noises in addition to reducing friction when the cover 10 is displaced relatively to the seal 32.

Figure 5:
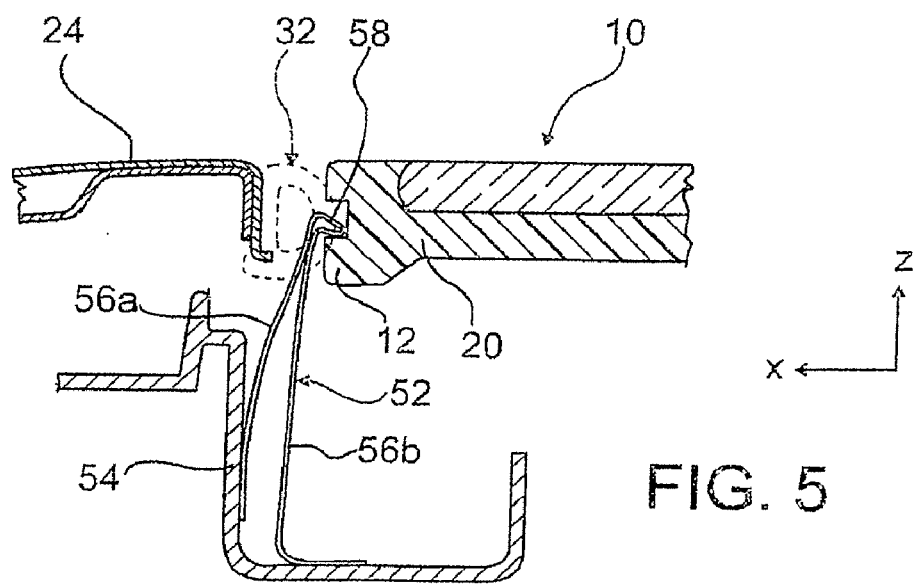
FIG. 5 shows an alternative embodiment of the invention with a hook member to lock the cover at its leading edge.

Another embodiment of the invention is shown in FIG. 5. A hook member 52 with a nose 58 that is slightly bent downwards is formed of sheet metal and forms a bracket which is fastened tightly to the roof (e.g., riveted or screwed together, welded) at a roof frame 54 by means of two fastening projections 56a, 56b. Alternatively, the hook member can also be made of plastics or it can be molded directly to it as a projection of the roof frame 54. The bracket like hook member 52 is formed such that it is stiff into a direction perpendicular to the roof skin 24.

The hook member 52 and the cover 10 are arranged relative to each other such that, when the cover 10 is displaced in the direction toward the closed position (i.e., in the x axis direction), a locking lug 12 of the cover picks up the hook member and comes into engagement with the hook member, so that the cover is secured in the closed position against upward displacement (in the z axis direction). In the embodiment of FIG. 5, this locking occurs without the hook member being moved by means of its own kinematics, but rather merely by the deformation of the hook member, which is stiff in the z-direction, but flexible and deformable in the x-direction. In an alternative embodiment (not shown), the hook member can be constructed to be also movable in the z-direction in certain limits. This is particularly advantageous if the cover, shortly before reaching the closed position, still extends downwardly to a relatively large amount; that means that the cover kinematics essentially makes a z-movement before reaching the final position. The length and positioning of the hook member of FIG. 5 are selected such that, after a displacement of the end opposite to the fastening projections 56a, 56b in the direction of the displacement of the cover, the hook member also hooks into the locking lug 12 of the cover in the x axis direction and is tensioned (in the z-direction) when the cover is further displaced to secure the cover in the region of the locking lug against a lifting off in the z axis direction in the closed position.

The locking lug 12 is formed in a peripheral foam 20 of the cover. The locking lug 12 releases the hook member again when the cover 10 is displaced from the closed position to the open position (opposite to the x axis direction). The release can be facilitated by a combined movement of the cover in the x and z axis directions.

In FIG. 5, a seal 32 is indicated only in dashed outline form at the leading edge of the roof opening the seal has a cut-out in the region of the hook member 52, into which the hook member 52 is received. Due to the small thickness of the hook member 52, a cut-out can also be omitted since the seal 32 will deform the hook member in the closed position of the cover 10 only insignificantly. Alternatively, a seal can also be attached to the edge areas of the cover, and a seal at the roof opening can be omitted. In this case, a damping element, such as a felt or rubber strip, can additionally be attached to the roof opening to dampen the attaching movement of parts of the cover against fixed roof regions. While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as encompassed by the scope of the appended claims.

The invention claimed is:

1. Vehicle roof, comprising:
    a roof opening disposed within a fixed roof outer skin of a vehicle (24) and
    a cover for selectively closing and at least partly opening the roof opening, the cover being be both tiltable out the roof opening at a rear edge thereof and displaceable to the rear relative to a forward driving direction to at least partially open the roof opening from a closed position,
    wherein the cover is provided with at least one locking lug in a region of a leading edge of the cover, the lug being engageable from below against a support element in a closed position of the cover, the support element being stiff in a direction perpendicular to the roof outer skin; and
    wherein the cover is configured so as to be free of contact from below against lateral and rear regions of the fixed roof skin bordering the roof opening in the closed position.

2. Vehicle roof according to claim 1, wherein the cover (10) is supported lowerable or liftable to be displaced in the longitudinal direction of the vehicle.

3. Vehicle roof according to claim 1, wherein the vehicle roof is one of a tilting and sliding sunroof, lifting and sliding sunroof, an externally guided sunroof and a lifting sunroof.

4. Vehicle roof according to claim 1, wherein the supporting element is a leading edge of the roof opening.

5. Vehicle roof according to claim 4, wherein the leading edge of the roof opening comprises a seal.

6. Vehicle roof according to claim 5, wherein the seal is a hollow chamber seal.

7. Vehicle roof according to claim 6, wherein the seal comprises a harder region and a softer region.

8. Vehicle roof according to claim 4, wherein, in a region of the leading edge of the roof opening, the fixed roof skin comprises an essentially rectangular, downward first bend in an end region, followed by an essentially perpendicular section of the fixed roof skin, and wherein the seal is mounted on the perpendicular section at a side facing toward the roof opening.

9. Vehicle roof according to claim 1, wherein the cover comprises a transparent pane.

10. Vehicle roof according to claim 9, wherein the pane comprises a peripheral foam and the locking lug is molded into the peripheral foam.

11. Vehicle roof according to claim 1, wherein the locking lug is an angle shaped portion of a cover edge area that extends in a direction toward the vehicle interior.

* * * * *